United States Patent
Nakamura

(10) Patent No.: US 6,966,421 B2
(45) Date of Patent: Nov. 22, 2005

(54) APPARATUS FOR VEHICLE-BODY TRANSPORT CARRIAGE

(75) Inventor: Setsuo Nakamura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 76 days.

(21) Appl. No.: 10/228,072

(22) Filed: Aug. 27, 2002

(65) Prior Publication Data

US 2003/0051335 A1 Mar. 20, 2003

(30) Foreign Application Priority Data

Sep. 14, 2001 (JP) .......................... 2001-278950
May 28, 2002 (JP) .......................... 2002-153201

(51) Int. Cl.⁷ .................................. B65G 21/20
(52) U.S. Cl. .................... 198/345.1; 198/343.1; 198/465.2; 198/803.12
(58) Field of Search .................. 198/345.1, 343.1, 198/465.2, 803.12, 468.9, 343.2, 340, 867.08, 867.09

(56) References Cited

U.S. PATENT DOCUMENTS

| | | | | | |
|---|---|---|---|---|---|
| 3,880,074 | A | * | 4/1975 | Seifert ........................ | 101/40.1 |
| 4,626,160 | A | * | 12/1986 | Shiomi et al. .......... | 414/222.06 |
| 4,787,505 | A | * | 11/1988 | Tweedy .................. | 198/867.08 |
| 5,060,781 | A | * | 10/1991 | Santandrea et al. ...... | 198/345.1 |
| 5,115,901 | A | * | 5/1992 | Santandrea et al. ...... | 198/345.3 |
| 5,160,011 | A | * | 11/1992 | Yoshiji et al. ........... | 198/345.3 |
| 5,322,156 | A | * | 6/1994 | Kakita et al. ............. | 198/463.3 |
| 5,347,700 | A | | 9/1994 | Tominaga et al. | |
| 5,348,142 | A | * | 9/1994 | Nishimura et al. .... | 198/867.08 |
| 5,474,166 | A | * | 12/1995 | Santandrea et al. ...... | 198/345.3 |
| 5,735,219 | A | * | 4/1998 | Kirker et al. .............. | 108/54.1 |
| 6,467,675 | B1 | * | 10/2002 | Ozaku et al. ............... | 228/175 |
| 6,474,460 | B2 | * | 11/2002 | Di Rosa .................. | 198/345.1 |

FOREIGN PATENT DOCUMENTS

| | | |
|---|---|---|
| JP | 3-10241 U | 1/1991 |
| JP | 2745841 | 2/1998 |
| JP | 2001-151176 A | 6/2001 |

OTHER PUBLICATIONS

Patent Abstracts of Japan, vol. 0184, No. 83, Sep. 8, 1994, JP-156662, Jun. 3, 1994.

* cited by examiner

Primary Examiner—Douglas Hess
(74) Attorney, Agent, or Firm—Foley & Lardner LLP

(57) ABSTRACT

A jig switching apparatus includes a locator jig slidably arranged on a transport carriage and having at a front end a locate pin with clamp function. The locator jig has two switching positions selectively switched in accordance with the type of a vehicle body to be positioned. A lock mechanism with an operating screw is disposed on the transport carriage. Through the operating screw operated by a nut runner, the lock mechanism mechanically positions and locks the locator jig in one of the switching positions with respect to a reference member disposed on the transport carriage.

7 Claims, 7 Drawing Sheets

APPARATUS FOR VEHICLE-BODY TRANSPORT CARRIAGE

BACKGROUND OF THE INVENTION

The present invention relates to an apparatus for vehicle-body transport carriages used on vehicle-body assembling lines, and more particularly, to a jig switching apparatus for general-purpose vehicle-body transport carriages suited for transporting bodies of different vehicle types in an interfluent way.

JP-B 22745841 discloses a general-purpose vehicle-body transport system applicable to a so-called interfluent manufacturing form of vehicle bodies.

SUMMARY OF THE INVENTION

With the related-art system, when switching the positions of locate pins, compressed air is supplied from outside to release an engaging or restraining force of a brake unit or the like. At the same time, home-position returning air cylinders with 3-orthogonal-axis degrees of freedom of operation are actuated to return the locate pins to their home positions once in the respective directions. Thus, aside from the brake unit, the home-position returning air cylinders should be arranged for the respective degrees of freedom of operation, leading to enlargement and complication of the overall system due to the increased number of parts.

Moreover, the system has the advantage that there is no need to arrange actuators for respective degrees of freedom of operation of multiaxial units. On the other hand, compressed air or the like should be supplied from outside to release an engaging force of the brake unit or the like which restrains the degree of freedom of operation of the corresponding multiaxial unit or to release clamping by the locate pin. This requires mounting of an auto-joint or a coupler to the carriage or pipe arrangement, resulting in the complicated structure of the transport carriage itself and further increase in installation cost.

It is, therefore, an object of the present invention to provide a jig switching apparatus for vehicle-body transport carriages, which contributes a reduction in installation cost with largely simplified structure.

The present invention provides generally an apparatus for a carriage for transporting a vehicle-body panel positioned and supported thereon, the carriage being circulated along a predetermined path in such a way that the unloaded carriage is returned to a start point of the path for reuse. The apparatus comprises a reference member disposed on the carriage; a locator jig slidably arranged on the carriage, the locator jig comprising at an end a locate pin for positioning the vehicle-body panel, the locate jig having positions selectively switched in accordance with a type of the vehicle-body panel to be positioned; an external shift mechanism mechanically coupled to the locator jig, the external shift mechanism switching the locator jig to one of the positions with respect to the reference member; a lock mechanism disposed on the carriage, the lock mechanism comprising a screw, the lock mechanism mechanically positioning and locking the locator jig in the one of the positions through the screw; and an external lock operating mechanism which operates the screw of the lock mechanism.

DETAILED DESCRIPTION OF THE INVENTION

Figure 1:
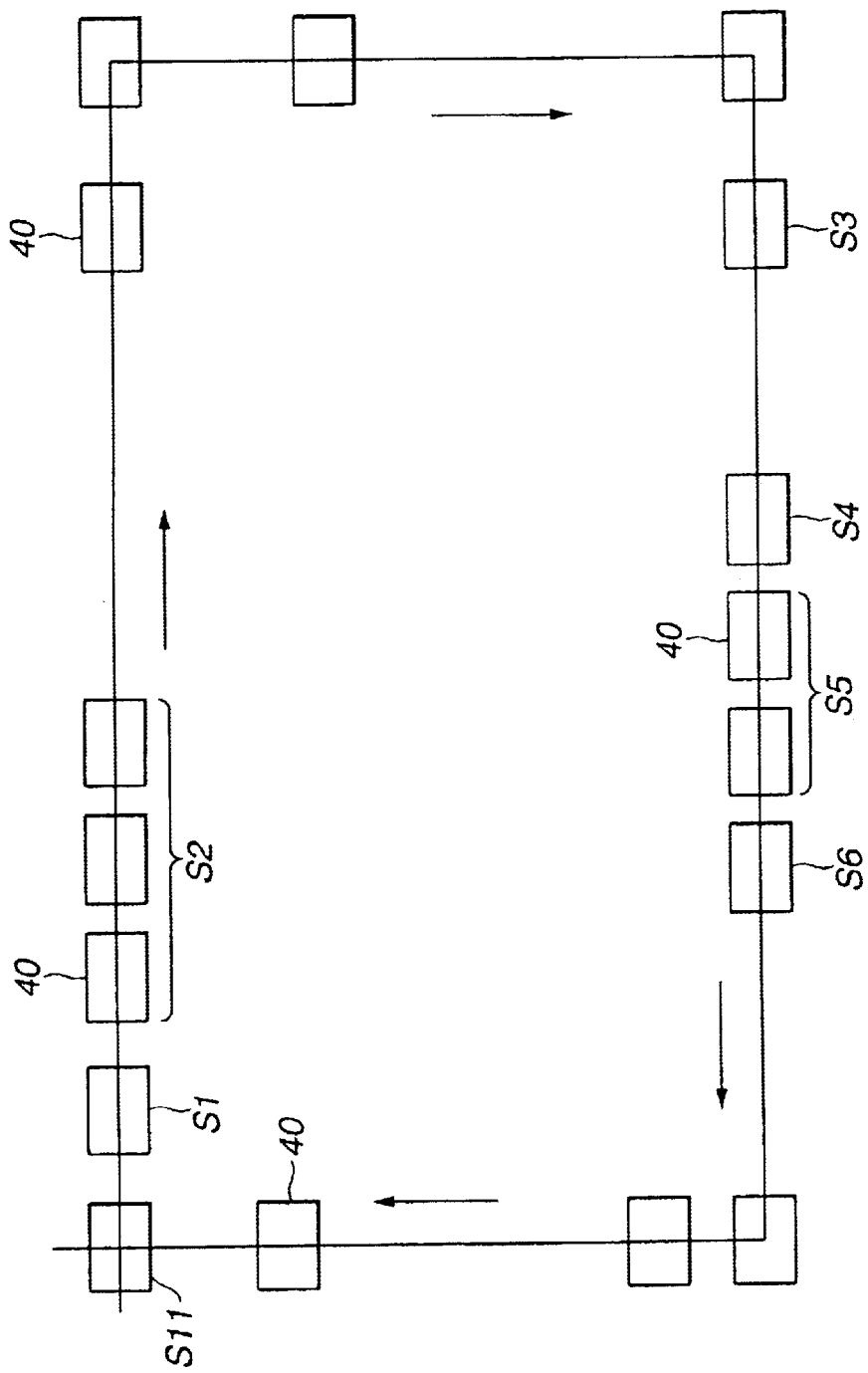
FIG. 1 is a schematic plan view showing a vehicle-body assembling line to which a vehicle-body transport carriage embodying the present invention is applied.

Referring to FIG. 1, there is shown a vehicle-body assembling line to which an embodiment of a vehicle-body transport carriage with jig switching function is applied. The vehicle-body assembling line is formed like a closed loop having at least a floor loading process S1, a floor-main reinforcing welding process S2, a body-side temporary assembling process S3, a body-main temporary welding process S4, a body-main reinforcing welding process S5, a roof temporary assembling process S6, etc. A transport carriage 40 with a predetermined vehicle-body panel mounted thereon is transported and moved by transport means, not shown, in the direction of arrows in FIG. 1, rendering step by step a vehicle body as a finished form.

The floor-main reinforcing welding process S2 is a process for carrying out spot welding with numbers of spots to a floor main or vehicle-body panel having an engine compartment and front and rear floors, etc. as assembled through temporary fixing in a previous process. The body-side temporary assembling process S3 is a process for temporarily assembling right and left body sides to the floor main subjected to reinforcing welding while positioning the former with respect to the latter. The body-main temporary welding process S4 is a process for carrying out spot welding with minimum required number of spots the floor main and the body sides while performing relative positioning therebetween. The body-main reinforcing welding process S5 is a process for carrying out spot welding with numbers of spots to the body main having the floor main and the body sides as assembled. And the roof temporary assembling process S6 is a process for temporarily assembling a roof panel to the body main.

When the transport carriage 40 is positioned in the floor loading process S1, the floor main transported by an overhead conveyor or the like, not shown, is loaded onto the transport carriage 40 by a drop lifter for positioning and mounting, which is delivered to the subsequent process.

A unloading process S11 is arranged upstream of the floor loading process S1, in which the body main or vehicle body subjected to a predetermined operation of welding assembling while taking a round of the assembling line is lifted by the drop lifter, then transported to the subsequent process by the overhead conveyor, achieving a unloaded state of the transport carriage 40. The unloaded transport carriage 40 is directly returned to the floor loading process S1 for reuse.

The transport carriage 40 comprises a plurality of fixed-position stationary gauges and a clamp for positioning and supporting the floor main or vehicle-body panel and a locate-pin type locator jig as will be described later. Since the assembling line itself is adapted to the interfluent manufacturing form wherein bodies of different vehicle types are assembled on a common line, the transport carriage 40 needs to be adaptable to positioning/supporting of bodies of different vehicle types. Thus, part of the gauges and the clamp are used in common for bodies of different vehicle types, whereas the locator jig is of the position switching type which allows switching of the position in accordance with the vehicle type to be positioned. Switching of the position of the locator jig should be carried out before loading of the target vehicle body or floor main, so that, in this embodiment, the floor loading process S1 also serves as a jig switching stage.

Figure 2:
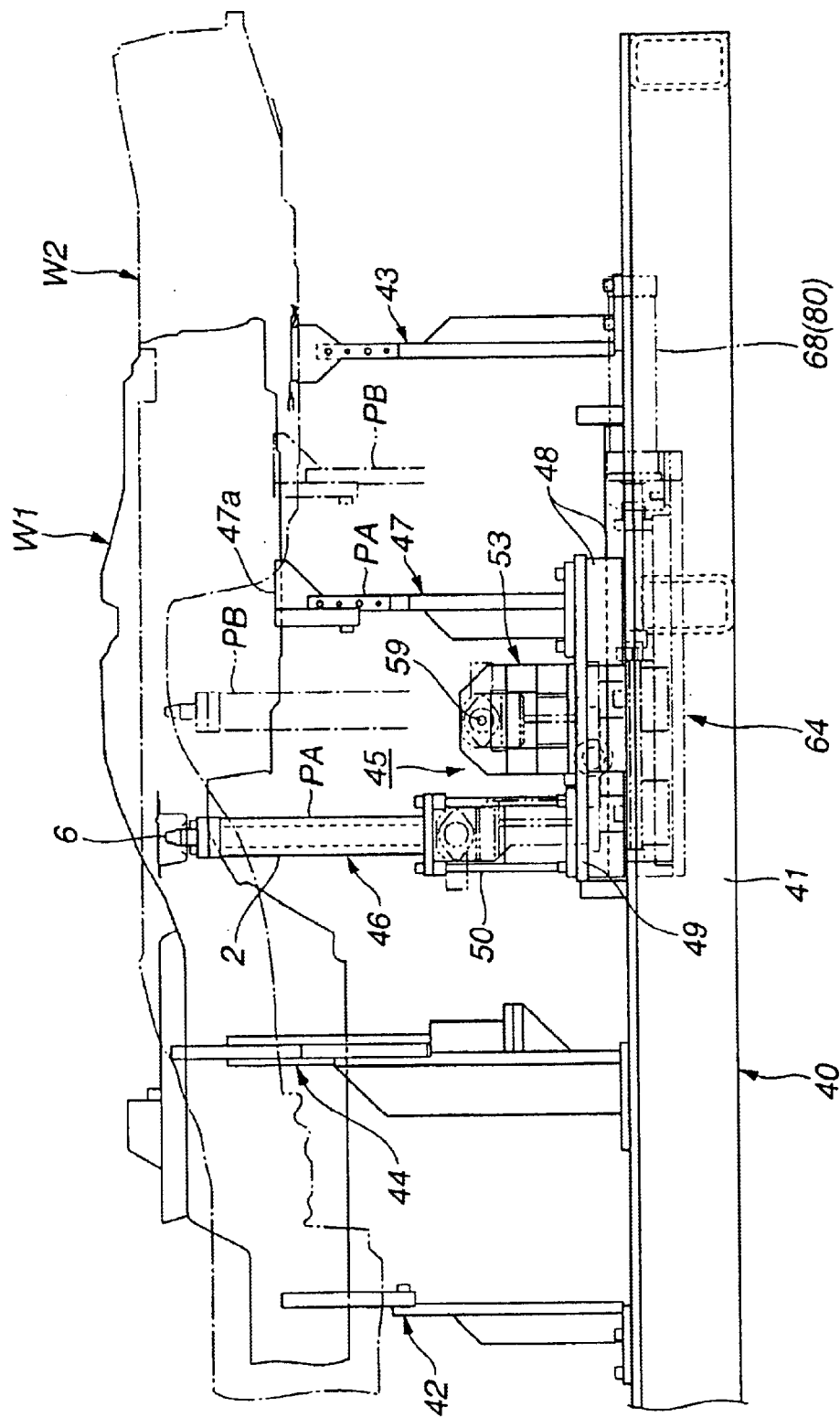
FIG. 2 is a side view showing the vehicle-body transport carriage.
Figure 3:
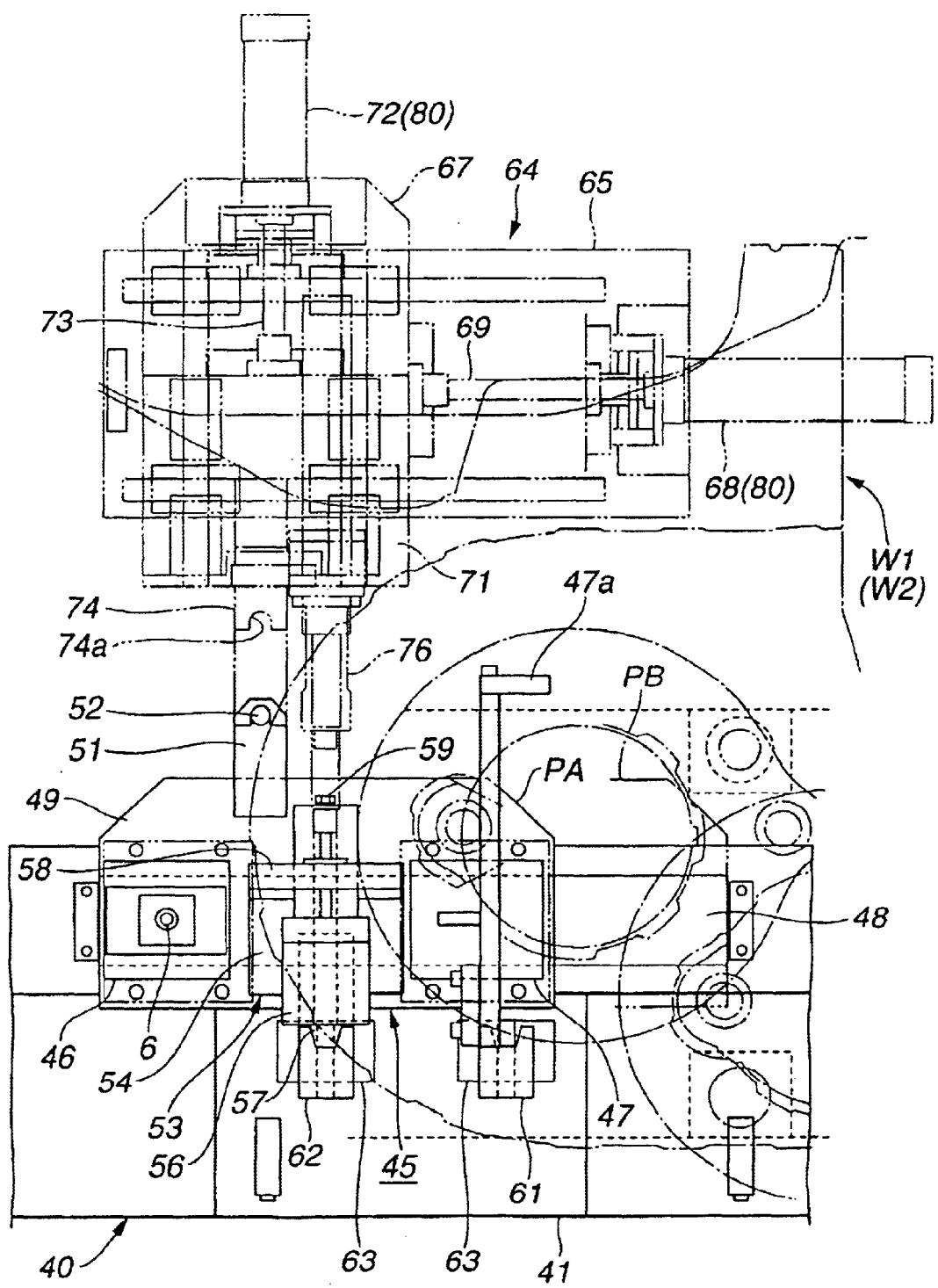
FIG. 3 is a plan view showing vehicle-body transport carriage

Referring to FIGS. 2–3, there is shown the transport carriage 40 positioned in the floor loading process S1 which also serves as jig switching stage. In this embodiment, the transport carriage 40 is adaptable to positioning/supporting of either of a floor main W1 for a vehicle type A and a floor main W2 for a vehicle type B, for example.

As shown in FIGS. 2–3, in order to obtain stable positioning/supporting of the floor main W1 or W2 as vehicle-body panel regardless of whether the vehicle type A or the vehicle type B, a plurality of fixed-position stationary gauges 42, 43 each having a predetermined panel receiving face, a clamp 44 having a swing-type clamp arm as a main element, and a switching-type jig 45 which allows selective switching through slide or shift motion are mounted on a main body or basic element 41 of the transport carriage 40. The switching-type jig 45 comprises a locator jig 46 including a locate pin with clamp function as a main element and a gauge 47 having a predetermined panel receiving face. The whole of the locator jig 46 and the gauge 47 can selectively be switched between a switching position PA for the vehicle type A and a switching position PB for the vehicle type B.

The locator jig 46 includes at a front end a locate pin 6 in which a clamp arm is built. The locator jig 46 serves to position the vehicle-body panel through engagement of the locate pin 6 with a corresponding locate hole and clamp the periphery of the locate hole though the clamp arm. The locate pin 6 with clamp arm built therein has a known structure.

Figure 4:
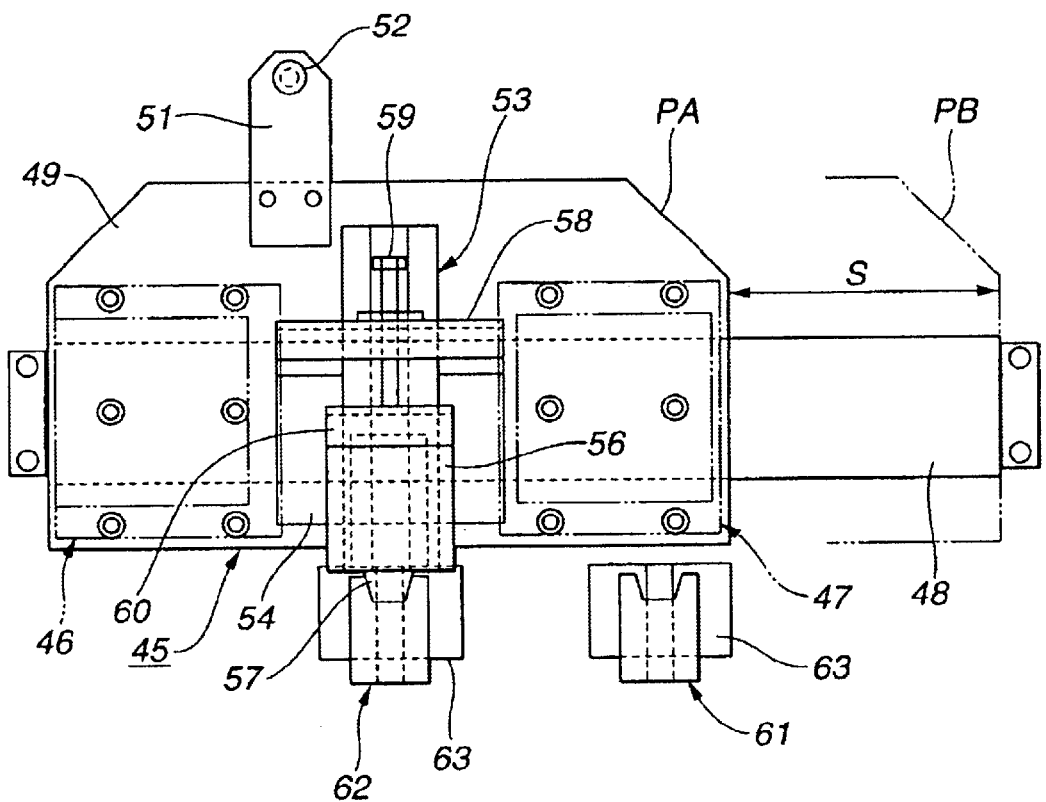
FIG. 4 is an enlarged view showing a switching-type jig in FIG. 3.
Figure 5:
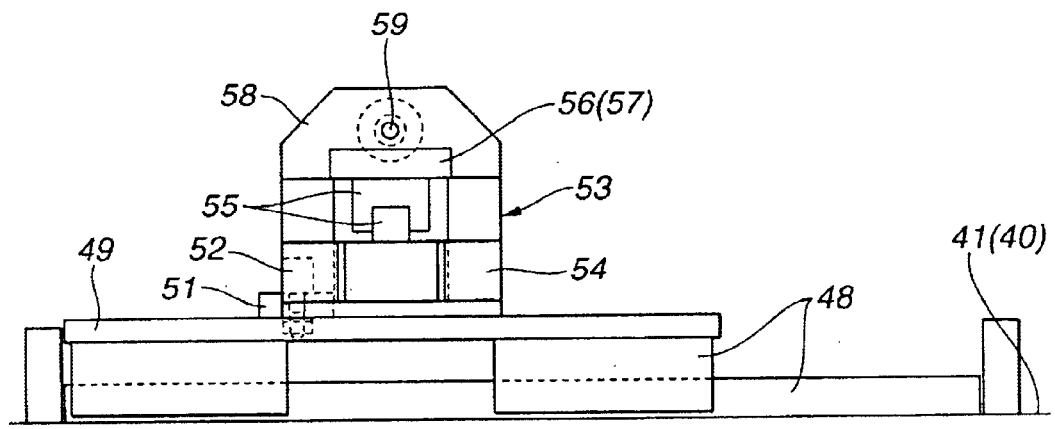
FIG. 5 is a front view showing the switching-type jig with a locator jig and a gauge omitted.
Figure 6:
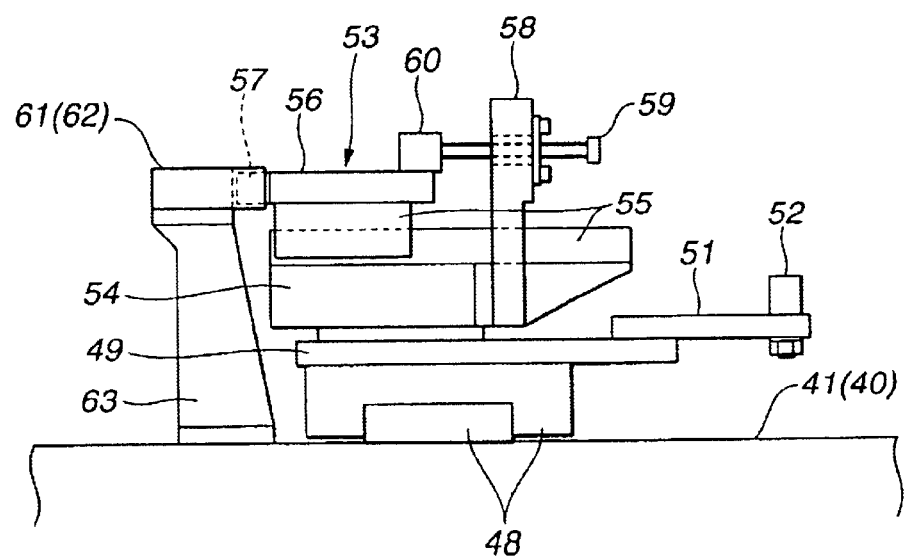
FIG. 6 is a view similar to FIG. 2, showing the right side of the switching-type jig with a locator jig and a gauge omitted.

Referring to FIGS. 4–6, there is shown the switching-type jig 45. A slide base 49 is disposed on the carriage main body 41 to be slidable in the same direction as the running direction of the transport carriage 40 through a linear guide 48. The locator jig 46 and the gauge 47 are adjacently arranged on the slide base 49. Thus, the locator jig 46 and the gauge 47, together with the slide base 49, can selectively be shift-switched to the switching position PA or PB in a stroke S as shown in FIG. 4.

The gauge 47 includes a simple panel receiving face 47a as shown in FIG. 3, whereas the locator jig 46 includes locate pin 6 with clamp function at a front end of a work pedestal 2 arranged on a stand 50 (see FIG. 2).

A guide pin 52 is mounted to the slide base 49 through a bracket 51. A lock mechanism or means 53 for mechanically positioning and locking the slide base 49 to the carriage main body 41 is arranged in the center of the slide base 49 located between the locator jig 46 and the gauge 47. The lock mechanism 53 comprises an auxiliary base 54 fixed on the slide base 49 and a slide block 56 mounted thereon through a linear guide 55. The slide block 56 is slidable in the direction orthogonal to the slide direction of the slide base 49. A trapezoidal follower block 57 is fixed to a front end of the slide block 56.

A support plate 58 is fixed to the auxiliary base 54 in such a way as to straddle a rail of the linear guide 55. The support plate 58 has a trapezoidal female thread previously formed and a trapezoidal operating screw meshed therewith. The operating screw 59 has a front end relatively rotatably coupled to the slide block 56 through an adapter 60. Thus, when rotating the operating screw 59 in the normal or reverse direction, the slide block 56, together with the follower block 57 fixed at its front end, is moved forward or backward in accordance with the screwing action.

A pair of right and left reference blocks or members 61, 62 is adjacently disposed on the carriage main body 41 at the same level as the follower block 57 of the lock mechanism 53 and with a span equal to the stroke S in FIG. 4. The reference blocks 61, 62 are fixed to a bracket 63 arranged on the carriage main body 41, each being formed like a roughly V block to allow the trapezoidal follower block 57. By press-contacting or engaging the follower block 57 with one of the reference blocks 61, 62 through the screwing action of the operating screw 59 as shown in FIGS. 3–4, the shift-switching type locator jig 46 and gauge 47, together with the slide base 49, are mechanically positioned and locked in the switching position PA or PB on the carriage main body 4.

Figure 7:
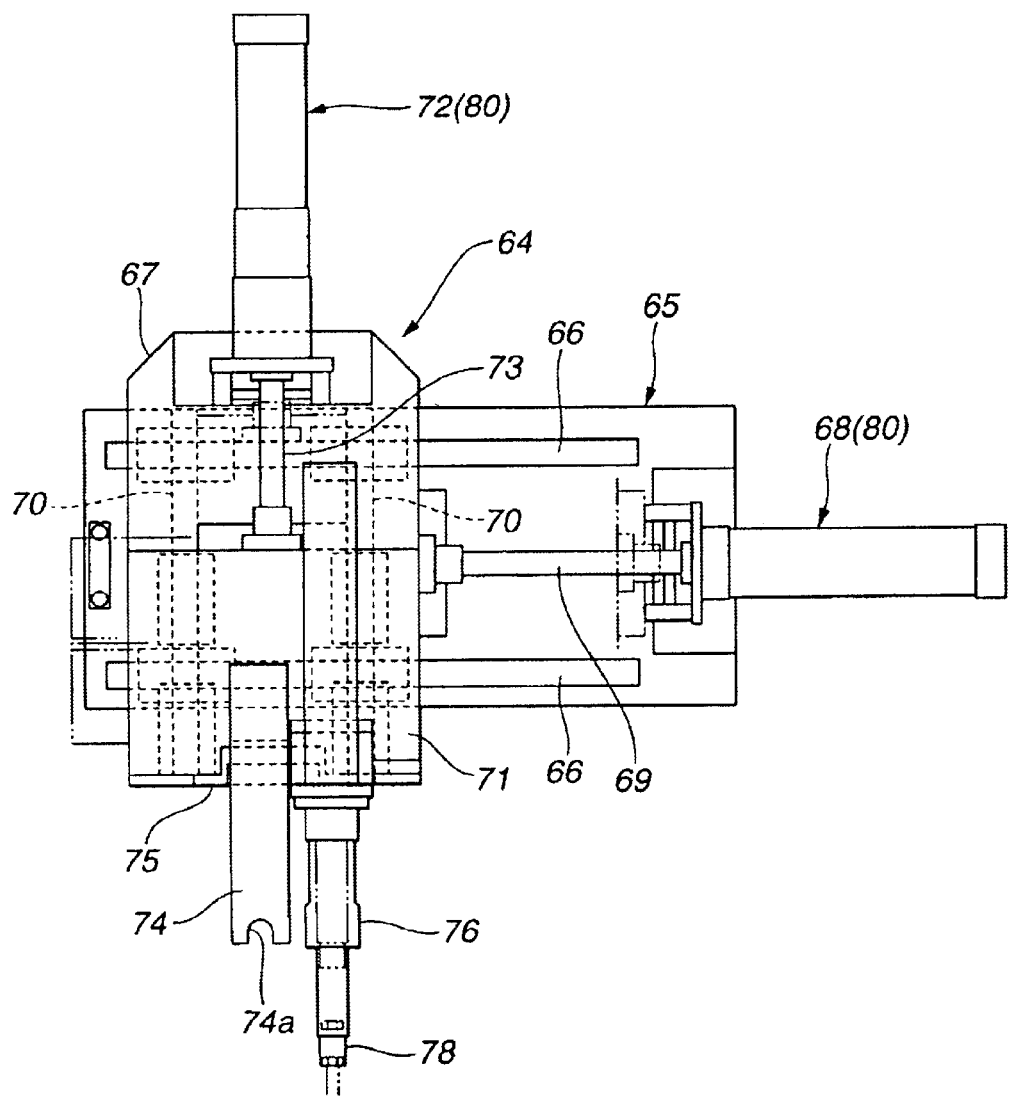
FIG. 7 is a view similar to FIG. 4, showing an external drive unit in FIG. 3.
Figure 8:
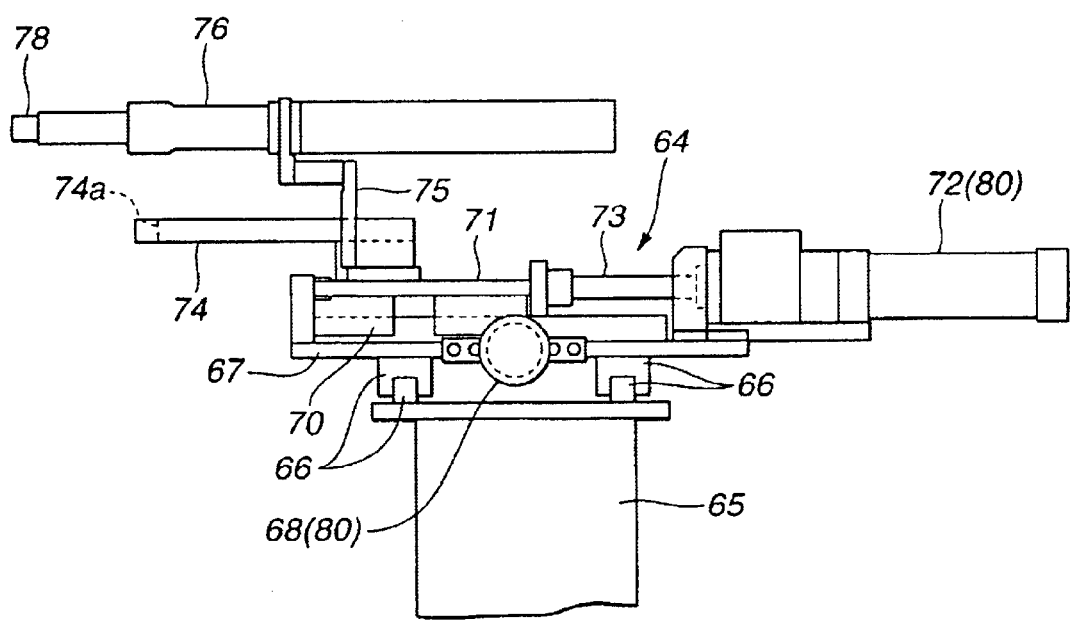
FIG. 8 is a view similar to FIG. 6, showing the external drive unit.

Referring to FIGS. 7–8, there is shown an external drive unit 64 disposed adjacent to the switching-type jig 45 in the jig switching stage (floor loading process S1) where the transport carriage 40 is positioned. The external drive unit 64 comprises external shift means and external lock operating means as will described later. The external drive unit 64 is disposed not to interfere with the transport carriage 40 and the main floor W1 or W2 loaded thereon in the non-driving state.

As shown in FIGS. 7–8, a shift table 67 is mounted on the stand 65 through a linear guide 66 to be slidable in the same direction as the carriage transport direction. A direct acting shift cylinder or actuator 68 is mounted to the stand 65, and includes a piston rod 69 coupled to the shift table 67, so that the shift table 67 is shifted in the carriage transport direction in a predetermined stroke in accordance with telescopic motion of the shift cylinder 68.

A cross table 71 is disposed on the shift table 67 through a linear guide 70 to be slidable in the direction orthogonal to the shift direction of the shift table 67. A direct acting approach cylinder or actuator 72 is mounted to the shift table 67, and includes a piston rod 73 coupled to the cross table 71, so that the cross table 71 is moved forward and backward with respect to the lock mechanism 53 in accordance with telescopic motion of the approach cylinder 72.

A fork 74 with an U-shaped engagement groove 74a at a front end is fixed on the cross table 71. A nut runner or external lock operating mechanism 76 is mounted thereon through a bracket 75 to be adjacent to the fork 74, and includes a socket 78 facing the operating screw 59 of the lock mechanism 53. The relative positional relationship between the engagement groove 74a at the front end of the fork 74 and a front end of the socket 78 of the nut runner 76 substantially corresponds to that between heads of the guide pin 52 and the operating screw 59 as shown in FIGS. 3–4.

Therefore, by urging the cross table 71 to approach the lock mechanism 53 in the state as shown, e.g. in FIG. 3, the engagement groove 74a of the fork 74 is engaged with the pin 52, and the socket 78 of the nut runner 76 is press-contacted or engaged with the head of the operating screw 59. Specifically, there are arranged external shift means or mechanism 80 for shifting the locator jig 46 and the gauge 47 including the shift table 67, the cross table 71, the shift cylinder 68, the approach cylinder 72 and the fork 74, and external lock operating means for locking and unlocking the lock mechanism 53 by the nut runner 76.

With the transport carriage 40 constructed as described above, when loading the floor main W1 or W2 of the vehicle type A or B in the floor loading process S1 as shown in FIG. 1, the switching-type jig 45 should be switched to the position in accordance with the vehicle type. Thus, prior to loading of the floor main W1 or W2, switching of the switching-type jig 45 is carried out in the floor loading process S1 which also serves as jig switching stage. Specifically, as shown in FIG. 2, in order to position and support the loaded floor main W1 of the vehicle type A, the switching-type jig 45 should be switched to the switching position PA, whereas in order to position and support the loaded floor main W2 of the vehicle type B, the switching-type jig 45 should be switched to the switching position PB.

Subsequent to the previous process, when the unloaded transported transport carriage 40 is positioned in the floor loading process S1 which also serves as jig switching stage, the actual position of the switching-type jig 45 is identified in accordance with past vehicle-body manufacturing history information or through detection of its actual position by a non-contact sensor.

In response to actual positional information on the switching-type jig 45, the external drive unit 64 is started to shift the shift table 67 to the shift position in accordance with the actual switching position PA or PB (PA in FIG. 3) of the switching-type jig 45, then to move the cross table 71 forward. With this, the engagement groove 74a of the fork 74 of the cross table 71 is engaged with the pin 52 of the switching-type jig 45 to achieve mechanical coupling of the two. At the same time, the socket 78 of the nut runner 76 is engaged or press-contacted onto the operation screw 59 of the lock mechanism 53 of the switching-type jig 45.

In that state, when the position of the switching-type jig 45 to be switched subsequently, i.e. the position of the floor main W1 or W2 to be determined subsequently in accordance with the vehicle type, corresponds to the actual position thereof, the external drive unit 64 is not started to load a predetermined floor main, e.g. the floor main W1 of the vehicle type A onto the switching-type jig 45 in the as-is state.

At that time, since the clamp arm built in the locate pin 6 of the locator jig 46 is unclamped, the locate pin 6 and the corresponding locate hole are smoothly seated and engaged with each other to position and clamp the floor main W1. When the floor main W1 is positioned and clamped by the locate pin 6, the cross table 71 of the external drive unit 64 is moved backward to deliver the transport carriage 40 to the subsequent process.

On the other hand, when the position of the switching-type jig 45 to be switched subsequently, i.e. the position of the floor main W1 or W2 to be determined subsequently in accordance with the vehicle type, does not correspond to the actual position thereof, e.g. when the actual position of the switching-type jig 45 is switching position PA of the vehicle type A, and the position to be switched subsequently is switching position PB of the vehicle type B, mechanical coupling of the external drive unit 64 and the switching-type jig 45 is already completed as described above. Thus, the nut runner 76 engaged or press-contacted onto the operating screw 59 of the lock mechanism 53 is started to rotate the operating screw 59 in the normal direction. With this, the slide block 56, together with the follower block 57, is moved backward in accordance with screwing action of the operating screw 59 as shown in FIGS. 4 and 6, so that press-contact or engagement of the reference block 61 with the follower block 57 is released, thus releasing locking of the switching-type jig 45 by the lock mechanism 53. Only after achieving this unlocking, slide motion or shift motion of the switching-type jig 45 become possible.

With locking released, the shift table 67 is shifted by a predetermined amount by contracting motion of the shift cylinder 68 as shown, e.g. in FIGS. 7–8. At that time, the fork 74 of the shift table 67 and the pin 52 of the switching-type jig 45 are kept coupled, and the nut runner 76 is engaged or press-contacted onto the corresponding operating screw 59. Thus, the slide base 49 of the switching-type jig 45 is shifted by the same amount in accordance with shift motion of the shift table 67, switching the position of the locator jig 46 and the gauge 47 from the switching position PA to the switching position PB. With shifting to the switching position PB, the follower block 47 of the lock mechanism 53 faces another reference block 62.

At the completion of shift-switching of the switching-type jig 45, the nut runner 76 engaged or press-contacted onto the operating screw 59 of the lock mechanism 59 is started again to rotate the operating screw 59 in the reverse direction. With this, the slide block 56, together with the follower block 57, is moved forward again in accordance with screwing action of the operating screw 59 to have the follower block 57 engaged or press-contacted onto another reference block 62. As a result, the switching-type jig 45 is locked in the switching position PB.

After switching the switching-type jig 45 to the switching position PB, the floor main W2 is loaded onto the switching-type jig 45 in the as is state in the same way as described above. And when the floor main W2 is positioned and clamped by the locate pin 6 of the locator jig 46, the cross table 71 of the external drive unit 64 is moved backward to deliver the transport carriage 40 to the subsequent process.

The same series of operations is carried out at shift-switching of the switching-type jig 45 from the switching position PB to the switching position PA.

According to the present invention, shift-switching of the switching-type jig 45 (locator jig 46) is carried out by the external drive unit 64, and locking and unlocking of the lock mechanism 53 of the switching-type jig 45 are carried out by external operation, i.e. screwing action of the operating screw 59, requiring no arrangement of an actuator and the like on the transport carriage 40. Moreover, locking of the switching-type jig 45 is self-maintained by a tightening force of the operating screw 59, securing very excellent preservation of locking without any occurrence of loosening during running of the transport carriage 40.

Having described the present invention in connection with the preferred embodiment, it is noted that the present invention is not limited thereto, and various changes and modifications can be made without departing from the scope of the present invention.

The entire teachings of Japanese Patent Application P2002-153201 filed May 28, 2002 and Japanese Patent Application P2001-278950 filed Sep. 14, 2001 are incorporated hereby by reference.

What is claimed is:

1. An apparatus for a carriage for transporting a vehicle-body panel positioned and supported thereon, the carriage being circulated along a predetermined path in such a way that the unloaded carriage is returned to a start point of the path for reuse, the apparatus comprising:

a reference member disposed on the carriage;

a locator jig slidably arranged on the carriage, the locator jig comprising at one end a locate pin for positioning the vehicle-body panel, the locator jig having positions selectively switched in accordance with a type of the vehicle-body panel to be positioned;

an external shift mechanism mechanically coupled to the locator jig, the external shift mechanism switching the locator jig to one of the positions with respect to the reference member;

a lock mechanism disposed on the carriage, the lock mechanism comprising a screw, the lock mechanism mechanically positioning and locking the locator jig in the one of the positions through the screw; and an external lock operating mechanism which operates the screw of the lock mechanism.

2. The apparatus as claimed in claim 1, wherein the positions of the locator jig are in a horizontal plane.

3. The apparatus as claimed in claim 1, wherein the external shift mechanism and the external lock operating mechanism are arranged on a jig switching stage set in a predetermined position of the path of the carriage.

4. The apparatus as claimed in claim 1, wherein the reference member comprises a block having a predetermined shape, the predetermined shape being a V shape.

5. The apparatus as claimed in claim 4, wherein the lock mechanism comprises a follower block engaged with the reference member in accordance with action of the screw, the follower block being shaped corresponding to the shape of the reference member.

6. An apparatus for a carriage for transporting a vehicle-body panel positioned and supported thereon, the carriage being circulated along a predetermined path in such a way that the unloaded carriage is returned to a start point of the path for reuse, the apparatus comprising:

a reference member disposed on the carriage;

a locator jig slidably arranged on the carriage, the locator jig comprising at one end a locate pin for positioning the vehicle-body panel, the locator jig having positions selectively switched in accordance with a type of the vehicle-body panel to be positioned;

external shift means mechanically coupled to the locator jig for switching the locator jig to one of the positions with respect to the reference member;

a lock mechanism disposed on the carriage, the lock mechanism comprising a screw, the lock mechanism mechanically positioning and locking the locator jig in the one of the positions through the screw; and external lock operating means for operating the screw of the lock mechanism.

7. An arrangement, comprising:

a carriage which transports a vehicle-body panel positioned and supported thereon, the carriage being circulated along a predetermined path in such a way that the unloaded carriage is returned to a start point of the path for reuse;

a reference member disposed on the carriage;

a locator jig slidably arranged on the carriage, the locator jig comprising at one end a locate pin for positioning the vehicle-body panel, the locator jig having positions selectively switched in accordance with a type of the vehicle-body panel to be positioned;

an external shift mechanism mechanically coupled to the locator jig, the external shift mechanism switching the locator jig to one of the positions with respect to the reference member;

a lock mechanism disposed on the carriage, the lock mechanism comprising a screw, the lock mechanism mechanically positioning and locking the locator jig in the one of the positions through the screw; and an external lock operating mechanism which operates the screw of the lock mechanism.

* * * * *

UNITED STATES PATENT AND TRADEMARK OFFICE
CERTIFICATE OF CORRECTION

PATENT NO. : 6,966,421 B2 Page 1 of 1
APPLICATION NO. : 10/228072
DATED : November 22, 2005
INVENTOR(S) : Setsuo Nakamura It is certified that error appears in the above-identified patent and that said Letters Patent is hereby corrected as shown below:

On the Title page,

[*] Notice: Subject to any disclaimer, the term of this patent is extended or adjusted under 35 USC 154(b) by (76) days Delete the phrase "by 76 days" and insert -- by 109 days --

Signed and Sealed this

Twenty-ninth Day of April, 2008

JON W. DUDAS
*Director of the United States Patent and Trademark Office*